(No Model.)

E. H. C. HARTMANN & A. MEEDOM.
FRICTION CLUTCH.

No. 442,374. Patented Dec. 9, 1890.

WITNESSES:
P. F. Nagler
L. Douville

INVENTOR
Emil H. C. Hartmann
Andrew Meedom
BY
John A. Wiedersheim
ATTORNEY.

UNITED STATES PATENT OFFICE.

EMIL H. C. HARTMANN AND ANDREW MEEDOM, OF PHILADELPHIA, PENNSYLVANIA, ASSIGNORS OF ONE-THIRD TO EDWIN A. ROTH, OF SAME PLACE.

FRICTION-CLUTCH.

SPECIFICATION forming part of Letters Patent No. 442,374, dated December 9, 1890.

Application filed March 24, 1890. Serial No. 345,137. (No model.)

*To all whom it may concern:*

Be it known that we, EMIL H. C. HARTMANN and ANDREW MEEDOM, citizens of the United States, both residing in the city and county of Philadelphia, State of Pennsylvania, have invented a new and useful Improvement in Friction-Clutches, which improvement is fully set forth in the following specification and accompanying drawings.

Our invention relates to improvements in friction-clutches; and it consists, first, of an oscillating cam or cams having fixed bearings on the shaft for moving the pulley into engagement with a fixed cone; second, of a collar mounted on a pulley-shaft and adapted to be moved by means of cams or eccentrics so as to bear against the pulley and engage it with a cone fixed on the shaft; third, of an adjustable bearing, substantially as described, on said shaft for the operating cam or cams.

It further consists of the combination of parts herein set forth.

Figure 1:
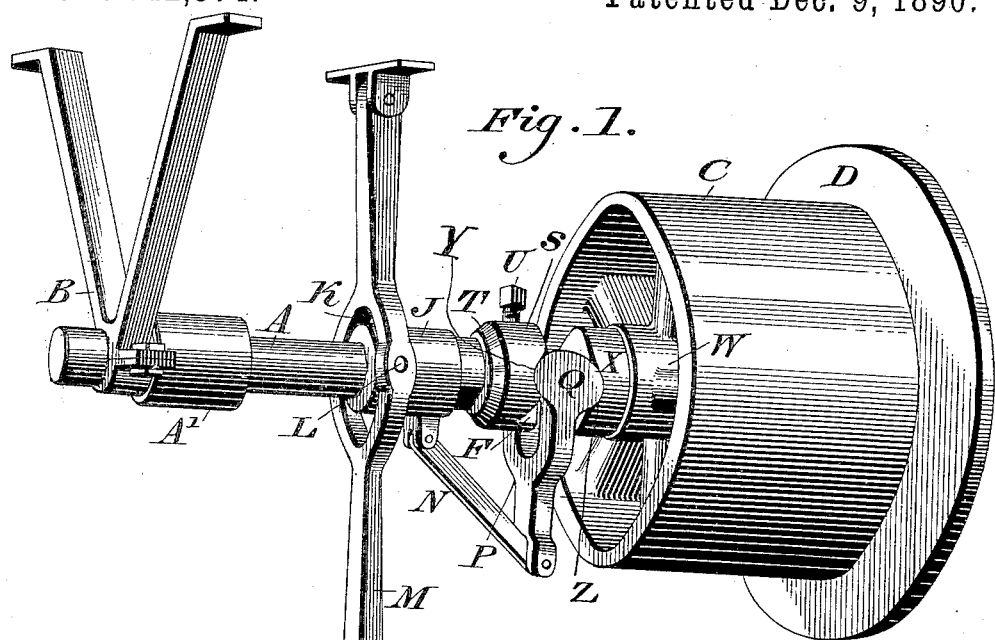
Figure 2:
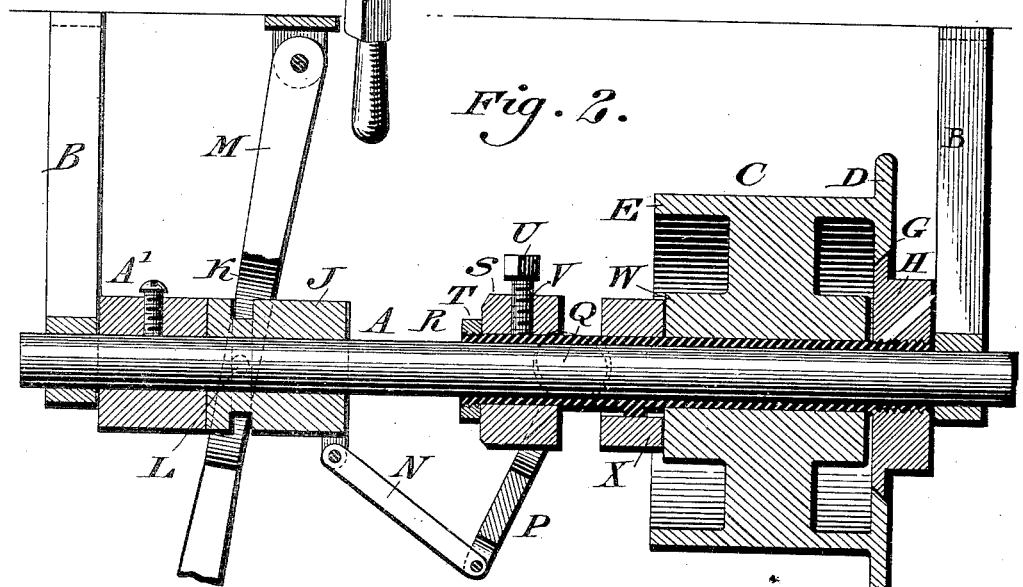

Figure 1 represents a perspective view of a friction-clutch embodying my invention, the pulley and cone being engaged. Fig. 2 represents a central horizontal section of the device shown in Fig. 1.

Similar letters of reference indicate corresponding parts in the two figures.

Referring to the drawings, A designates a rotary shaft having suitable bearings in the hangers B. On the said shaft A is freely mounted the pulley C, having a radially-projecting flange D on one side of its rim E, forming the walls of an opening, the said walls being tapering or conical at their outer edge, as at G, to correspond with the face of a cone H, which is rigidly secured to the said shaft.

Freely mounted on the shaft A is a collar J, in the groove K of which projects the pins or studs L of the lever M, which latter is pivoted at one end to a suitable support. To an ear or lug on the said collar J is pivotally secured one end of an arm N, the other end of the said arm being pivotally fastened to one end of a forked arm P, having the cams or eccentrics Q at the outer ends of the said forks. Each of the cams is in the form of a disk having axes of different lengths, and the collar S has recessed portions F, the walls of which form stops for the forks of the arm P.

On a screw-threaded portion or attachment R of the shaft is a collar S, having on one side a recessed portion Y, the walls of which furnish fixed bearings for said cams Q. A nut T on said threaded portion R adjusts the position of the collar S thereon, and to hold the said collar in place a clamping-screw U is employed, the said screw passing through an opening V in the collar and having its point bearing on the said attachment or shaft. Between the cams Q and the hub W of the pulley is a collar X, adapted to be moved endwise on the shaft and having recesses Z on its side adjacent to the cams, the walls of the said recesses serving as bearings for said cams. The recessed portions of the collars S and X also form a secure support for the cams or eccentrics Q and the forked arm P. It will be noticed that the arms N and P form a toggle-lever, and that by placing the cams on opposite sides of the shaft a direct motion is imparted to the collar X, so that it will move freely on the said shaft.

A' designates a collar secured to the shaft A, to limit the movement in one direction of the grooved collar J on the said shaft.

The operation is as follows: The parts being in position, as shown in Fig. 1, the cone H of the clutch mechanism being engaged with the pulley, when it is desired to release the said pulley, so that it will run loose on the shaft, the handle end of the lever M is moved in a direction away from the pulley, thus moving the collar J and the arm N, so that the outer end of the forked arm P is moved toward the shaft, thereby oscillating the cams Q, so that their shorter axes are in line of and between the collars S and X, and the said collar X is not forced against the hub, thereby clamping the pulley against the cone, but leaves the said pulley free to rotate on the shaft A. If it now be desired to connect the pulley and shaft so that they rotate together, the handle end of the lever is moved toward the pulley, pushing the collar J and the arm N inward and moving the outer end of the arm P from the shaft, thus partially rotating the cams Q, so that their longer axes are in line of and between the fixed collar or bearing S and the movable collar X. This movement forces the said collar X against the hub W, so that the pulley is brought in such close contact with the cone H so as to revolve therewith. The adjustment of the position of the fixed bearing on collar S on the shaft A is accomplished by means of rotating the nut T on the threaded attachment or part R of the shaft, the clamping-screw U binding the collar in fixed position, as is evident.

Having thus described our invention, what we claim as new, and desire to secure by Letters Patent, is—

1. In a friction-clutch, a loose pulley having a radially-projecting flange, a shaft with a fixed cone thereon, a fixed collar on said shaft, and oscillating cams having bearing against said fixed collar and adapted to contact with the hub of the pulley, said parts being combined substantially as described.

2. In a friction-clutch, the combination of a loose pulley with side opening having conical walls, a fixed cone having its periphery engaging said conical walls of the opening in the pulley, a movable collar bearing against the hub of the pulley, a fixed bearing, and a cam or cams located loosely between said fixed bearing and the movable collar, substantially as described.

3. A friction-clutch having a loose pulley, a fixed cone against which the said pulley is adapted to bear, a fixed bearing, an arm with a cam or cams, the latter between said fixed bearing and pulley, a collar with an arm pivotally attached thereto and to the cam-arm, and a pivoted lever adapted to move said collar endwise on a shaft on which the said parts are mounted, said parts being combined substantially as described.

4. In a friction-clutch, the combination of a shaft, a fixed cone, and a loose pulley thereon, a fixed bearing with recessed side, a movable collar with recessed side, an arm with oscillating cam having bearings in said recessed sides of the adjustable bearing, and the movable collar, substantially as described.

5. In a friction-clutch, an adjustable bearing for an operating-cam, consisting of a shaft having a threaded portion, a collar on said shaft provided with a set-bolt and recesses, a nut on said threaded portion and against said collar, and a sliding collar X, also having recesses, said parts being combined substantially as described.

EMIL H. C. HARTMANN.
ANDREW MEEDOM.

Witnesses:
JOHN A. WIEDERSHEIM,
L. JENNINGS.